United States Patent [19]

Zuckerwar et al.

[11] Patent Number: 5,146,083

[45] Date of Patent: Sep. 8, 1992

[54] HIGH TEMPERATURE FIBER OPTIC MICROPHONE HAVING A PRESSURE-SENSING REFLECTIVE MEMBRANE UNDER TENSILE STRESS

[75] Inventors: Allan J. Zuckerwar, Newport News, Va.; Frank W. Cuomo, East Providence, R.I.; William E. Robbins, Achilles; Purnell Hopson, Jr., Seaford, both of Va.

[73] Assignee: The United States of America as represented by the Administrator of the National Aeronautics and Space Administration, Washington, D.C.

[21] Appl. No.: 586,369

[22] Filed: Sep. 21, 1990

[51] Int. Cl.$^5$ ............................................. H01J 40/14
[52] U.S. Cl. ........................... 250/227.21; 250/231.19; 73/705; 358/12
[58] Field of Search ...................... 250/227.21, 227.28, 250/231.19; 367/174, 176; 73/705, 715, 723; 350/96.21, 96.22, 96.24; 358/12, 115

[56] References Cited

U.S. PATENT DOCUMENTS

| | | |
|---|---|---|
| 3,580,082 | 5/1971 | Strack . |
| 3,789,667 | 2/1974 | Porter et al. . |
| 3,831,137 | 8/1974 | Cuomo . |
| 3,903,497 | 9/1975 | Stimler et al. . |
| 3,940,608 | 2/1976 | Kissinger et al. . |
| 4,098,031 | 7/1978 | Hartman et al. . |
| 4,149,423 | 4/1979 | Zuckerwar et al. ................... 73/724 |
| 4,158,310 | 6/1979 | Ho ................................. 250/227.11 |
| 4,210,029 | 7/1980 | Porter . |
| 4,258,508 | 3/1981 | Wilson et al. . |
| 4,286,468 | 9/1981 | Altman . |
| 4,310,905 | 1/1982 | Palmer . |
| 4,329,017 | 5/1982 | Kapany et al. . |
| 4,354,735 | 10/1982 | Stowe et al. . |
| 4,363,115 | 12/1982 | Cuomo . |
| 4,446,543 | 5/1984 | McLandrich et al. . |
| 4,473,747 | 9/1984 | Brogardh et al. . |
| 4,512,113 | 4/1985 | Budinger . |
| 4,547,668 | 10/1985 | Tsikos ........................... 250/227.21 |
| 4,550,975 | 11/1985 | Levinson et al. . |
| 4,599,711 | 7/1986 | Cuomo . |
| 4,687,927 | 8/1987 | Iwamoto et al. . |
| 4,926,696 | 5/1990 | Haritonidis et al. . |
| 4,932,263 | 6/1990 | Wlodarczyk . |

OTHER PUBLICATIONS

Frank W. Cuomo, "Pressure and Pressure Gradient Fiber-Optic Lever Hydrophones" *J. Acoust. Soc. Am.* 73(5), May 1983, pp. 1848–1857.

ICIASF '89 Record—International Congress on Instrumentation in Aerospace Simulation Facilities, IEEE Publication 89CH2762-3, pp. 503-509, Sep. 1989.

Allan J. Zuckerwar, "Theoretical Response of Condenser Microphones" *J. Acoust. Soc. Am.* 64(5), Nov. 1978, pp. 1278-1285.

Primary Examiner—David C. Nelms
Assistant Examiner—Que T. Le
Attorney, Agent, or Firm—Kevin B. Osborne

[57] ABSTRACT

A fiber optic microphone is provided for measuring fluctuating pressures. An optical fiber probe having at least one transmitting fiber for transmitting light to a pressure-sensing membrane and at least one receiving fiber for receiving light reflected from a stretched membrane is provided. The pressure-sensing membrane may be stretched for high frequency response. Further, a reflecting surface of the pressure-sensing membrane may have dimensions which substantially correspond to dimensions of a cross section of the optical fiber probe. Further, the fiber optic microphone can be made of materials for use in high temperature environments, for example greater than 1000° F. A fiber optic probe is also provided with a backplate for damping membrane motion. The backplate further provides a means for on-line calibration of the microphone.

24 Claims, 7 Drawing Sheets

HIGH TEMPERATURE FIBER OPTIC MICROPHONE HAVING A PRESSURE-SENSING REFLECTIVE MEMBRANE UNDER TENSILE STRESS

The invention described herein was jointly made by employees of the U.S. Government and an contractor employee during the performance of work under a NASA Grant. In accordance with 35 U.S.C. 202, the contractor elected not to retain title.

BACKGROUND OF THE INVENTION

1. Field of the Invention

The present invention is directed to fiber optic sensors, and in particular, to fiber optic microphones for measuring fluctuating pressures.

2. Description of the Related Art

Fiber optic pressure sensors are known and fall primarily into either of two categories: interferometric sensors or intensity-modulated sensors (fiber optic lever). Interferometric sensors respond to a change of phase of light in a sensing fiber relative to that in a reference fiber. The fiber optic lever, on the other hand, responds to changes in intensity of the light reflected from a vibrating surface.

In the fiber optic lever, light from a light source is directed through a transmitting fiber, reflected from a mirror on a membrane, intercepted by receiving fiber(s), and detected by a light receptor. When the membrane vibrates, it modulates the intensity of the received light. A transfer coefficient of light, which is the ratio of total radiated light power from the proximal tip at the photodiode of the receiving fibers to the total incident power into the transmitting fiber, may be determined. The transfer coefficient is lightly sensitive to the displacement between the mirror and the distal end of the fibers.

Since prior art fiber optic levers use either a massive optical reflector or an unstretched membrane as the pressure sensing element, they suffer limited frequency response. Further, those using an unstretched membrane have no means of damping the membrane motion to suppress sharp peaks in the frequency response. Still further, these sensors lack means for on-line calibration.

Interferometric fiber optic sensors enjoy the advantage of higher sensitivity than known fiber optic levers, but in field applications suffer the serious disadvantage that they respond to vibration and thermal gradients along the entire length of the fibers. The fiber optic lever, on the other hand, is sensitive only to events taking place in the small gap between the distal end of the fibers and the mirror on the vibrating membrane.

Other sensors are known which are based upon a constitutive property such as piezoelectricity, piezoresistance, or magnetostriction. For example, non-fiber optic pressure sensors include the piezoresistive transducer manufactured by Kulite Semiconductor Products, Inc. or Endevco Corp.; the piezoelectric transducer manufactured by PCB Piezotronics, Inc.; the ceramic microphone manufactured by General Radio Co.; and the condenser microphone manufactured by Bruel & Kjaer, Inc. These sensors are inherently low-temperature devices, although some commercially available sensors permit operation at moderately high temperatures. For example, the Kulite HEM-375 Series or PCB Piezotronics Model 123A can operate at 500° F. The attachment of a water-cooled jacket to such a sensor will permit operation at higher temperatures. However, the attachment of a water-cooled jacket to piezoelectric, piezoresistive, or magnetostrictive sensors has two main disadvantages: first, the water-cooled sensor creates a cold spot in the high-temperature test environment and may profoundly influence the fluctuating pressures to be measured; secondly, the volume occupied by the cooling jacket prevents close sensor proximity which is required in some applications.

The condenser microphone is provided with a backplate and a membrane which create a capacitor wherein pressure changes are measured by measuring capacitance changes. Although the condenser microphone exhibits good performance in regard to bandwidth, it suffers a serious limitation. Since capacitive loading by the connecting cable reduces the microphone sensitivity and contributes to 60 Hz interference, it is necessary that a signal conditioning electronic circuit, also known as a preamplifier, be located in close proximity to the pressure sensing element. This makes the condenser microphone impractical for use in confined spares. Further, the input capacitance of the preamplifier limits the minimum practical size.

U.S. Pat. No. 4,599,711 to Cuomo discloses a multi-lever miniature fiber optic transducer. A bifurcated fiber optic transducer comprises one transmit fiber and at least one pair of receive fibers, each receive fiber pair having two fibers with different core diameters. The transmit and receive fibers are separated at one end and combined at the distal end in the vicinity of a miniature reflective surface sensitive to axial motion caused by minute pressure changes, either in air or water, such that any displacement of the reflector from equilibrium will increase or decrease different illuminated areas of the receive fibers which can be used to generate a processed output signal proportional to this motion, thus providing a sensitivity and an output independent of variations at the input. The reflector is provided in an unstretched state at the distal end of the fiber through an optically clear bonding compound.

Kaman Sciences Corporation markets an eddy-current sensor capable of operating at temperatures up to 2000° F. as the "KP-1911 Series Basic System Configuration." A disadvantage of the Kaman sensor is the limited frequency response. Eddy currents are generated in a metallic button attached to a vibrating membrane, and thus the button mass-loads the membrane and severely limits the response at high frequencies.

U.S. Pat. No. 4,149,423 to Zuckerwar discloses a high-temperature microphone system. The sensor is a condenser microphone driven by a radio frequency oscillator through a bulky half-wavelength transmission line. Consequently, the sensor cannot attain a small size, high frequency response, or high operating temperature desired in many applications.

U.S. Pat. No. 4,687,927 to Iwamoto et al discloses a pressure measuring system in which light is transmitted through an optical fiber to an unstretched diaphragm having a reflective surface. The diaphragm reflects light to another optical fiber and to a photosensitive element. A second reference optical fiber is provided to compensate for system fluctuations. The reflective surface area is large compared with the area of the optical fibers.

U.S. Pat. No. 4,926,696 to Haritonidis et al discloses a fiber optic micropressure transducer. A thin diaphragm is positioned across a chamber from an optical surface and micromachined into a substrate. A fiber optic assembly is mounted facing one side of the diaphragm.

Coherent light from a fiber is partly reflected by the diaphragm and recombines in the fiber to produce an interference pattern which is indicative of diaphragm deflection.

U.S. Pat. No. 4,932,263 to Wlodarczyk discloses a temperature compensated fiber optic sensor comprising a wall enclosing a chamber formed from two members micromachined in silicon or a similar substance, a membrane which may have an optical grating formed thereon, and a fiber optic fiber which extends into the cavity parallel to the membrane. Light is injected into the fiber with a wavelength that couples with the grating on the membrane. The coupling varies with pressure outside the chamber.

U.S. Pat. No. 4,473,747 to Brogardh et al discloses a semiconductor structure for a fiber optic pressure sensing element. The sensor comprises an unstretched diaphragm consisting of at least two layers applied to an apertured substrate, at least one of the layers having luminescent properties. Stresses in the diaphragm change the spectrum of luminescent light emitted by the active luminescent layer. The luminescence may be sensed by an optical fiber. The sensitivity of the diaphragm is chosen by the cross-sectional area of a cavity formed in the sensor and the thickness of the diaphragm.

In pressure sensors, it is desirable to calibrate the sensor to obtain a true reading of the pressure fluctuations. Calibration has been performed by attaching an electrode to the outside surface of the pressure-sensing membrane. This suffers a disadvantage at high frequencies because the electrode interferes with acoustical signals. Further, since the electrode is not a part of the sensor, the measurements are affected.

Fiber optic sensors which measure fluctuating pressures by detecting changes in light transmission from a membrane require a membrane having good reflectivity. Typically, the membrane must be processed to have the requisite reflectivity. For example, polishing may be required to produce a highly reflective surface.

A number of methods are known for polishing surfaces. For example, U.S. Pat. No. 4,098,031 to Hartman et al discloses a method for lapping and polishing a semiconductor material. A wafer is bonded to a spacer which is capable of accommodating surface irregularities by applying a suitable adhesive such as wax. The spacer and the wafer are then mounted to a mounting plate which is inserted into a lapping fixture for lapping and polishing.

U.S. Pat. No. 4,258,508 to Wilson et al discloses a method of holding down wafers mounted on a mounting plate without the use of wax. Once mounted, the wafers are mounted on a polishing machine, and thereafter, the wafers are cleaned with hydrofluoric acid.

U.S. Pat. No. 4,512,113 to Budinger discloses a workpiece holder for a polishing operation provided with a template releasably secured to a carrier by an adhesive layer. The template has a plurality of equally spaced holes defining a cavity. Inserts are provided in each cavity and include a vacuum material bonded to a fixturing material by an adhesive layer. Four pieces are releasably secured to the fixturing materials and extend beyond the exposed major face of the template. After mounting the workpieces, they can be polished in a polisher.

There is a need for sensors capable of detecting fluctuations in pressure. In particular, there is a need for sensors which are capable of achieving a high frequency response, are small in size, and are capable of operating at high temperatures. Further there is a need for techniques for processing membranes used in such sensors so that their surfaces have the requisite reflectivity for detecting changes in pressure. Still further, it is desirable to provide means for calibrating such sensors.

SUMMARY OF THE INVENTION

A fiber optic microphone is provided comprising an optical fiber made of at least one transmitting fiber and at least one receiving fiber, and a reflecting membrane for reflecting light from the transmitting fiber to the receiving fiber. Changes in the surface of the reflecting membrane are detected by changes in the light reflected therefrom. In a preferred arrangement of the fiber optic microphone of the invention, the membrane is stretched to provide high frequency response. In an especially preferred embodiment, an active diameter of the membrane corresponds to the diameter of the optical fiber probe. This active diameter may be very small to permit further enhanced high frequency response. In another arrangement of the invention, a backplate is utilized to dampen membrane motion. A backplate may also be used in an on-line calibration embodiment of the invention. The backplate and the membrane are subjected to a voltage potential to create membrane vibration which can be used for calibration purposes on-line. The fiber optic microphone can further be constructed for use in high temperature environments.

The present invention also provides a method for processing a thin membrane material to a shiny finish. Membrane material is mounted to a slide which is mounted to a polishing fixture by use of bonding material.

BRIEF DESCRIPTION OF THE DRAWINGS

A more complete understanding of the present invention can be obtained by reference to the accompanying drawings, wherein.

DETAILED DESCRIPTION OF PREFERRED EMBODIMENTS

The present invention provides an apparatus for measuring time-varying pressures in air or other gases over a wide band of frequencies. Measurement of timevarying pressures may be accomplished in aerodynamic boundary layers where small size, wide dynamic range and on-line calibration means are essential. Further, measurement of time-varying pressures in high temperature (1000° F. or higher) environments may be accomplished by the present invention, as may be found in internal combustion or jet engines, high speed boundary layers, or geothermal applications. The present invention further provides a method for processing membranes used in such sensors.

Figures 1A, 1B:
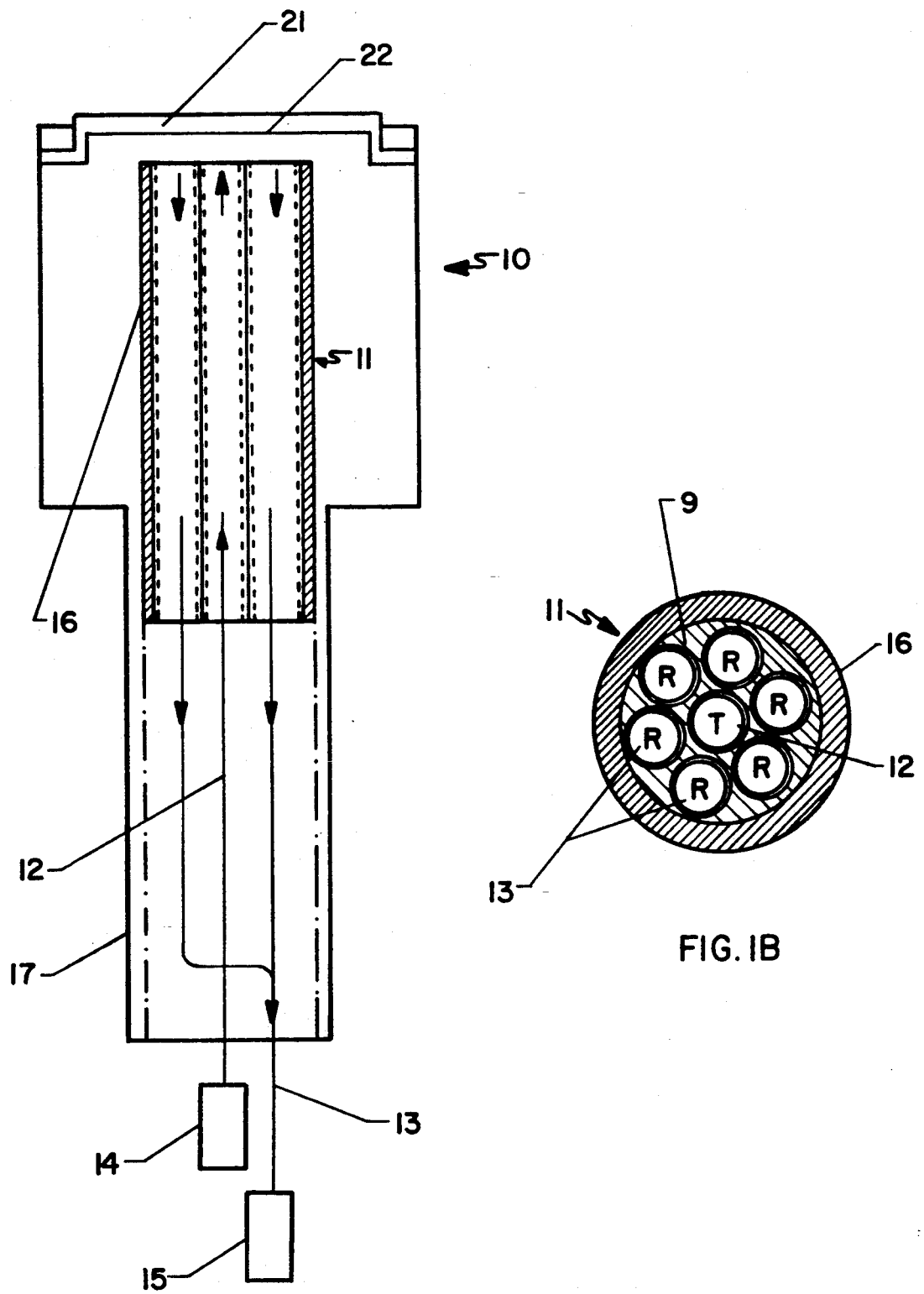
FIG. 1A is a cross-sectional view of an optical fiber probe of the present invention.
FIG. 1B is a sectional view of the optical fiber probe shown in FIG. 1A.

The basic components of a fiber optic microphone of the present invention are shown schematically in FIG. 1A. An optical fiber probe 11 is comprised of input and output optical transmission lines 12 and 13, respectively. An optoelectronic transmitting unit 14 and an optoelectronic receiving unit 15 are provided for transmitting and receiving light. Light generated in the optoelectronic transmitting unit 14 is transmitted over the optical transmission line 12 into a microphone cartridge 10. The light is reflected by a mirror 22 on a pressure sensing element, and a portion of the light is received by the optical transmission lines 13 and carried to the optoelectronic receiving unit 15. The amount of light received by the optoelectronic receiving unit 15 is used to detect pressure changes upon the pressure sensing element.

The light generated by the optoelectronic transmitting unit 14 may be from a conventional source such as a light emitting diode (LED) such as, for example, Motorola type MFOE1202, or a laser diode (LD) such as, for example, Mitsubishi Part No. 4102A. The optoelectronic receiving unit 15 is also conventional, and may contain a photodiode such as, for example, EG & G type FFD-040, and a transimpedance preamplifier which concerts the optical signal to an electrical output.

Sound pressure incident upon the membrane 21 modulates the intensity of the receiver light, and the optoelectronic receiving unit 15 provides an electrical signal proportional to the instantaneous incident sound pressure at the microphone cartridge 10.

The optical transmission lines of the present invention may be arranged, for example, as shown in FIG. 1B. FIG. 1B shows one possible arrangement of fibers comprised of one centrally located transmitting fiber 12 and six surrounding receiving fibers 13. The optical fibers are contained tightly in a hypodermic metal tubing 16 and held in place by means of a suitable bonding agent 9. The number of receiving fibers and their core diameters can vary, depending on the ultimate size and necessary sensitivity of the microphone cartridge assembly. Smaller core diameters, as small as four microns or less, permit higher frequency response ranges. Core diameters ranging in size from about 50 microns to about 400 microns are acceptable for many uses and are commercially available from Fiberguide Industries.

Connections of the optical fibers to the optoelectronic supporting units 14 and 15 may be achieved by means of optical fiber connectors available from several manufacturers, such as, for example, AMP Special Industries Series 501529 or Amphenol Fiber Optic Products, Series 905/906.

The invention has greater bandwidth sensitivity and miniaturization potential than piezoelectric and piezoresistive sensors. The invention does not suffer from 60 Hz interference or capacitive loading by a connecting cable because it does not require signal conditioning electronics in close proximity to the membrane, as is the case of the condenser microphone. The present microphone can operate effectively at a much smaller size than the condenser microphone. Within the class of intensity-modulated fiber optic pressure sensors, the invention has a greater bandwidth and a smoother frequency response than prior art sensors.

In one embodiment, the invention is designed to achieve operation at temperatures reaching 1000° F. or above. The optical fiber probe components 9, 12, 13 and 16 must be made of materials which will withstand these high temperatures. An important factor involves the construction of the optical fibers 12 and 13. In the past, commonly available organic-coated silica fibers have been satisfactory for use at room temperature. However, at elevated temperatures and harsh environments, these fibers cannot be used. In particular, it is well known that optical fibers fail through moisture-induced microcracking. This moisture-induced microcracking reaches critical levels at elevated temperatures. To overcome this problem, the fibers of the present invention are hermetically sealed to prevent moisture penetration. This protection can be achieved by coating the optical fiber cladding with special materials such as metals or unique polymer jackets. For example, suitable fibers include a multimode step-index fiber having a 100-micron core, a 140-micron cladding, and an aluminum jacket with an outside diameter of about 165 microns, developed by Hughes Aircraft Company to perform at temperatures up to 1022° F. Similar gold-clad fibers are useful up to 1382° F. Other fibers clad with polyamide, for example polyamide available under the trade name "Thermocoat", for operation at lower temperatures such as 725° F., are available from Fiber Guide Industries, Inc.

Suitable materials for the membrane 21 include metal foils, for example of nickel, platinum, aluminum, stainless steel, and the like. Pure metals, or metals having a low alloy content are preferred since alloys tend to crack upon forming. The thickness of the thin membrane may range between about 0.0005 inch and about 0.002 inch. Non-heat resistance materials may also be used, especially in low temperature environments where heat resistance is not required. A thin substrate having a reflective surface deposited thereon, for example a 0.0005 inch thick Mylar substrate having an aluminum film deposited thereon, may also be used. Silicon may be used as a membrane material, but requires fabrication by micromachining techniques, whereby the membrane could be formed as an integral part of the microphone body assembly 20. The remaining parts of the cartridge may be made of stainless steel or any other material capable of withstanding high temperatures in the case of high temperature resistant sensors.

Bonding agent 9 may comprise as suitable adhesive for the environment in which the sensor is to be used. In high temperature applications it is preferred that high temperature adhesives be employed, for example ceramic adhesives, such as that available as "Cermabond" manufactured by Aremco Products, Inc. These high temperature adhesives may be used at temperatures reaching 4400° F. Low temperature adhesives may also be used when the sensor is used in a low temperature environment. The bonding agent may be used such that vent holes are provided for permitting the passage of air around the fibers. This arrangement performs a damping function without the requirement of a damping backplate. Vent holes may eliminate the need for a backplate, and allow for a small-size microphone.

Components 9, 12 and 13 may, if desired, be installed in a suitable sheath such as a hypodermic needle 16 made from, for example, Type 304 stainless steel or ceramic material. The optical fibers 12 and 13 are further protected by a ceramic sleeving 17. This high temperature sleeving may comprise braided alumina fibers such as Nextel 312 braided sleeving manufactured by the 3M Company. This product is rated to retain its strength and flexibility at continuous temperatures up to 2200° F. The ceramic sleeving may be rigid or flexible, and although optional, it is preferred for high temperature applications.

The fiber optic lever shows numerous potential advantages with regard to high-temperature operation. When compared to condenser microphones, the fiber optic lever possesses three primary advantages. First, because acoustical signals are transmitted optically rather than electrically, there is no loading by cable capacitance or 60 Hz noise due to capacitive pickup. The usual practice of locating a condenser microphone preamplifier as close as possible to the microphone cartridge is not viable at high temperatures. Secondly, the same loading effect limits the minimum practical size of a condenser microphone to about ⅛ inch, but the minimum size of a fiber optic microphone is limited by the size of the optical fibers, which are currently available in diameters as small as 0.0039 inch as rated for 600° C. service. Finally, the fiber optic microphone has an inherent advantage in band width. The reason for this stems from the fact that the condenser microphone responds to the mean displacement of the membrane, while the fiber optic microphone responds to the displacement at the center of the membrane. At some frequency between the first and second membrane resonant frequencies, the mean displacement falls to zero. As a result, the response of the condenser microphone drops very rapidly just after the fundamental resonant frequency. The center displacement, on the other hand, never falls to zero. Thus, provided the membrane damping is adjusted properly, the frequency response of the fiber optic sensor can be extended to beyond the second resonant frequency.

In particular, high frequency response may be obtained by stretching the membrane so that tensile stress is provided therein. In the present invention, a membrane may be provided which is under tensile stress while at rest, i.e. in the absence of pressure fluctuations. For room temperature operations, it is preferred that the membrane for the optical fiber microphone be stretched about 60% to about 80% of the yield stress of the material used for the membrane. For high temperature operations, the membrane is stretched less than room temperature operation because the material tends to weaken at higher temperatures. For example, the membrane is preferably stretched to about 25% of the yield stress for high temperature operations of about 2000° F.

Figure 2:
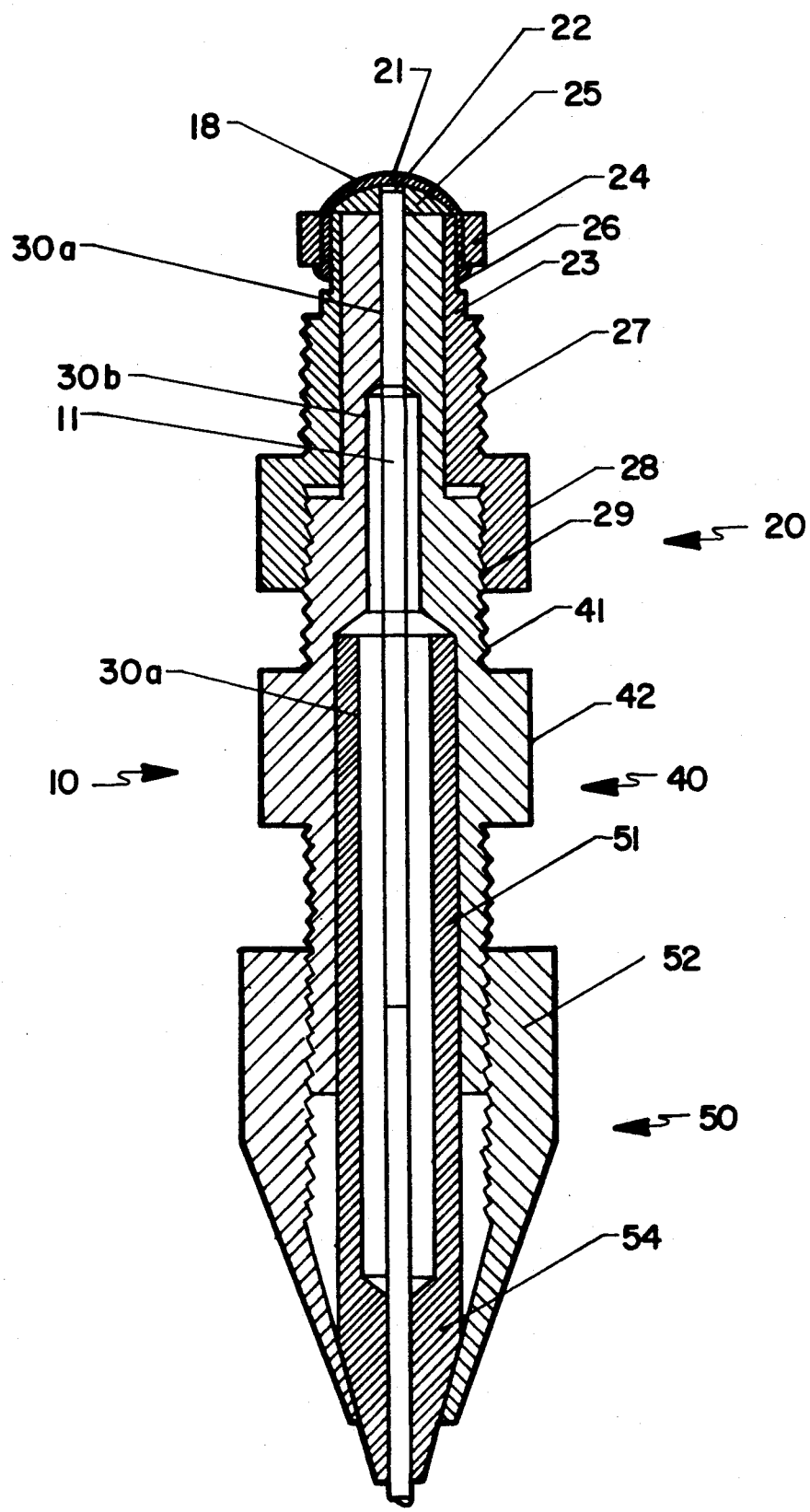
FIG. 2 is a cross-sectional view of a microphone cartridge of the present invention.

A microphone cartridge 10 of the invention is shown in detail in FIG. 2. The microphone cartridge 10 comprises a body assembly 20, tension adjuster 40 and a pin-vise assembly 50.

The body assembly 20 includes the membrane 21 which serves as the pressure sensing element. The membrane 21 is stretched over a tension ring 25 and is secured around a case 23 by a restraining ring 24. The membrane 21 is polished on one surface to improve optical reflectivity, by a novel procedure described below, and then formed into the shape of a cup by means of a punch die. After the cup-shaped membrane 21 is positioned over the tension ring 25 and case 23, the retaining ring 24 is fitted over the membrane 21 (e.g., by press-fitting) to secure its position. To ensure that the membrane is held in place as tension is applied, the membrane 21 is preferably joined to both the case 23 and the retaining ring 24, for example by means of a weld 26, such as an electron beam weld. A taper on the top surface of the tension ring 25 causes the tension to pull the membrane 21 toward the case 23. The taper thus serves to stabilize the static position of the membrane in the presence of severely fluctuating pressure loads. An air gap 18 is provided between the mirror surface 22 of the membrane and the optical fiber probe 11. The air gap may be adjusted to between about 50 and 250 microns.

A tension adjuster is provided for tensioning (stretching) the membrane. Any means of applying tension to the membrane may be utilized in the present invention. A stretched membrane extends the bandwidth of the sensor. In an exemplary embodiment, the tension adjuster 40 is provided to apply tension to the membrane 21. A lower portion of the case 23 is provided in a form which may be gripped, securely. For example, the lower portion of the case 23 may be machined into the form of a square or hexagonal nut 28. The tension adjuster 40 contains similar gripping portion, denoted as nu& 42, which may be gripped, for example in an external torque wrench, and has external threads 41 which engage mating internal threads 29 in the case 23. Torque applied to the nut 42 forces the tension adjuster 40 to rotate, advance along the axis of the cartridge 10, and exert a force upon the membrane 21 through the tension ring 25. The tension in the membrane 21 is controlled through the level of the applied torque, as may be determined from a reading on a torque wrench indicator (not shown). If the membrane is stretched to a tension corresponding to 25% of the yield stress of nickel (in the case of high temperature operation), then the frequency response will extend to about 100 kHz. With smaller diameter cores of the optical fiber probe, frequency responses beyond 100 kHz are possible.

An axial hole extends through the tension adjuster 40 and includes three sections 30a, 30b and 30c, respectively. Section 30a, which also penetrates the tension ring 25 and is nearest to the membrane 21, is preferably of such a diameter as to ensure a sliding but snug fit to the optical fiber probe 11. This arrangement further permits the diameter of the reflecting surface to substantially correspond with the diameter of the optical fiber probe. High frequency response is achieved by having a small active membrane diameter corresponding to the optical fiber probe diameter. Generally, where one transmit fiber is surrounded by six receiving fibers, this diameter corresponds to about three times the diameter of an individual fiber of the probe. Individual fiber diameters may be as small as about 1 mil, in which case a membrane diameter of 3 mils would be preferred. Section 30b is of greater diameter than section 30a, and serves to reduce the length of section 30a to facilitate its drilling by a small-diameter drill. Section 30c, of greater diameter than section 30b, seats the collet 51 of the pin-vise assembly 50.

Figure 3A:
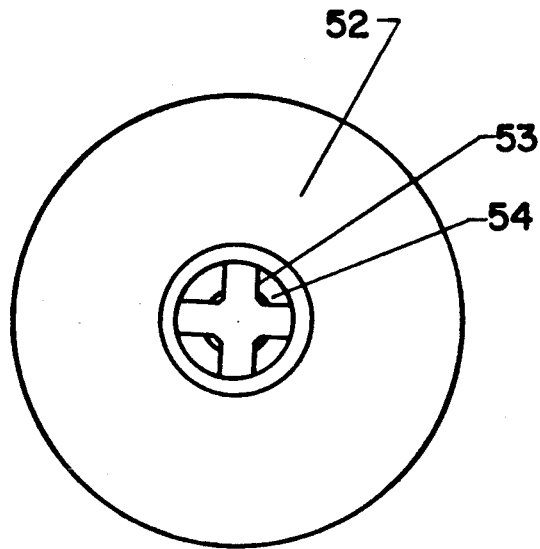
FIGS. 3A and 3B are cross-sectional views of a pinvise assembly of the invention.
Figure 3B:
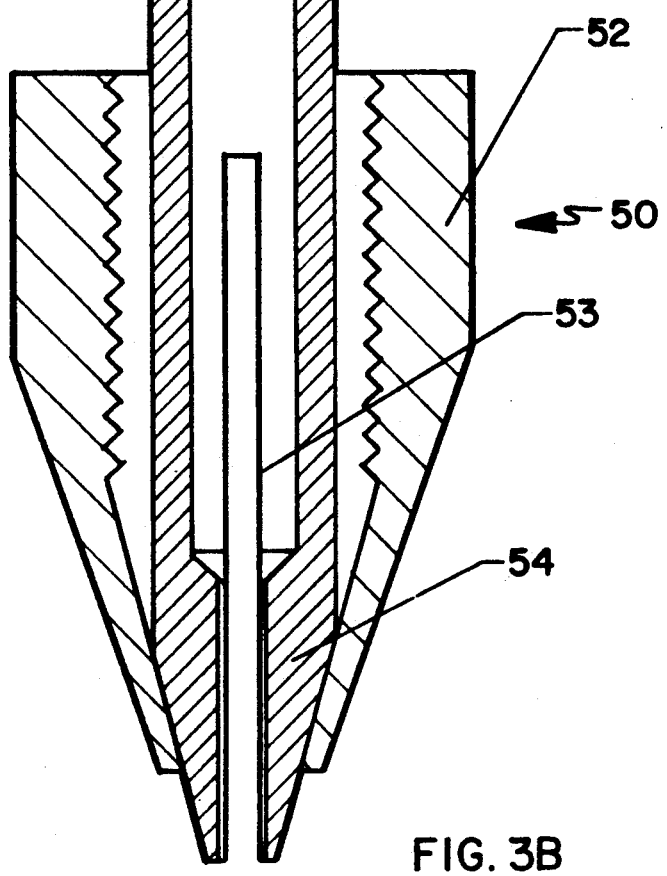

The pin-vise assembly 50 is shown in detail in FIGS. 3A and 3B. The pin-vise assembly 50 comprises a slotted collet 51 and a draw nut 52. The collet 51 contains four slots 53 and four flutes 54 for rendering a firm and secure grip upon the optical fiber probe 11. The draw nut 52 may advance along the axis of the tension adjuster 40 and press the flutes 54 against the optical fiber probe 11 to secure the optical fiber probe in place.

An alternative method of securing the optical fiber probe in place is by use of any suitable bonding agent in place of the pin-vise assembly 50.

In assembling the microphone cartridge 10, the cup-shaped membrane 21 is positioned over the tension ring 25 and case 23, and the retaining ring 24 is fitted over the membrane to secure its position. The weld 26 may be provided to further secure the membrane 21. The tension in the membrane 21 is then adjusted by causing the tension adjuster 40 to rotate and advance along the axis of the microphone cartridge 10. After the membrane tension is adjusted to a value corresponding to a prescribed torque setting, the optical fiber probe 11 is installed into the microphone cartridge 10.

To ensure proper operation of the pressure sensor, the optical fiber probe 11 must be properly positioned in the microphone cartridge 10, and the membrane 21 must be tensioned to provide an acceptable frequency response. Since the width of the air gap 18 establishes the optimum sensitivity of the device, the final adjustment of the probe must conform to this requirement. Then, the probe 11 is secured in place by means of the pin-vise assembly 50. Typical dimensions of the microphone may be ⅛ inch for the cartridge diameter, 0.033 inch for the active membrane diameter, and 50–250 microns for the air gap 18.

In another embodiment of the invention, the basic components of the system shown in FIG. 1A are utilized. However, in addition to modulating the light intensity received by the optoelectronic receiver 15 in proportion to an incident sound pressure, the components of the exemplary microphone cartridge 100 shown in FIG. 4 fulfill two additional functions: damping the membrane motion to achieve smooth frequency response over the entire bandwidth; and providing an on-line calibration means to track changes in microphone sensitivity as may occur in hostile environments.

Figure 4:
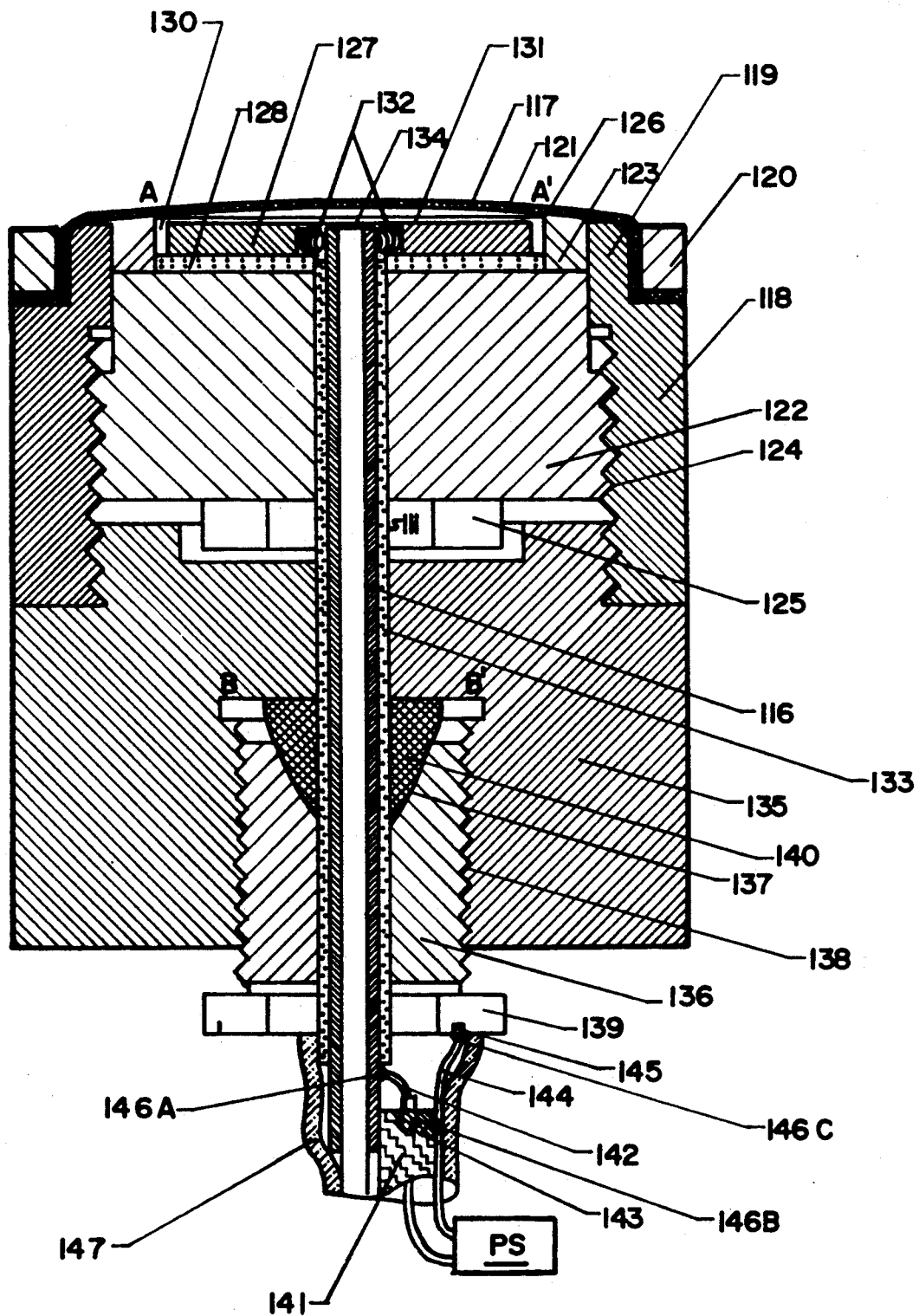
FIG. 4 is a cross-sectional view of another microphone cartridge of the present invention.

A cross-section of the microphone cartridge 100 is shown in FIG. 4. A membrane 117 is clamped between a shoulder 119 of a microphone case 118 and a tightly press-fit clamping ring 120. The membrane 117 can be any elastic material with a mirrored finish 121 on the side facing the interior of the cartridge 100. For example, the membrane material may be a thin material as discussed above in connection with the first embodiment. Tension is applied to the membrane by any suitable means which will impart tensile stress to the membrane In an exemplary embodiment, tension is provided by a tension adjuster 122 and a tension ring 123. The tension adjuster 122 contains external threads 124, which engage similar threads in the case 118, and a nut 125 machined on or attached to the bottom side. Torque applied to the nut 125, by means of an external tool, rotates the tension adjuster 122, forces it to advance along the microphone axis, and presses the tension ring 123 against the membrane 117, thus applying tension to the membrane A rim 126 of the tension ring 123 is a contact surface of small curvature which defines the active sensing area of the membrane 117 as the circular area of diameter A-A'. This area need not correspond to the diameter of the optical fiber probe as preferred in the first embodiment. The active membrane area may be quite large in comparison with the membrane diameter area preferred in the first embodiment. For example, this area may be as large as about two inches in diameter.

A metallic backplate 127 and an insulating support 128 together comprise a backplate assembly. The backplate assembly fulfills two functions: damping the membrane motion and providing an on-line calibration means. The backplate 127 is bonded to the insulating support 128, and the latter is tightly fit into the tension ring 123. A slot 130 around the periphery of the backplate 127 prevents its contact to the tension ring 123. The slot 130 also functions to permit the passage of air for the damping function.

The remaining parts of the microphone cartridge 100 may be made of any suitable material, for example, titanium or stainless steel. Suitable materials for the insulating support 128 include, for example, nylon, teflon, boron nitride, or a machinable glass-like material. The membrane 117 may also be made of a metal with a polished surface, for example, nickel Without the backplate 127, the motion of the membrane 117 may be highly underdamped. Consequently, the microphone response may show a very large peak about a membrane resonant frequency. A function of the backplate 127 is to dampen the membrane motion and thus achieve a smooth frequency response over the entire operating bandwidth. To fulfill this function, the backplate 127 should be located close to the membrane 117. For example, if the active membrane diameter A-A' is ¼ inch, then the gap 131 between the membrane 117 and the backplate 127 should be no larger than about 0.002 inch to render an effective damping. An advantage of the arrangement shown in FIG. 4 is that as the tension adjuster 122 advances toward the membrane 117, the size of the gap 131 remains constant A capillary vent hole can be introduced to pass air between the gap 131 through the cartridge 100 to the ambient environment for the purpose of equalizing the static pressure on either side of the membrane 117.

Figure 5:
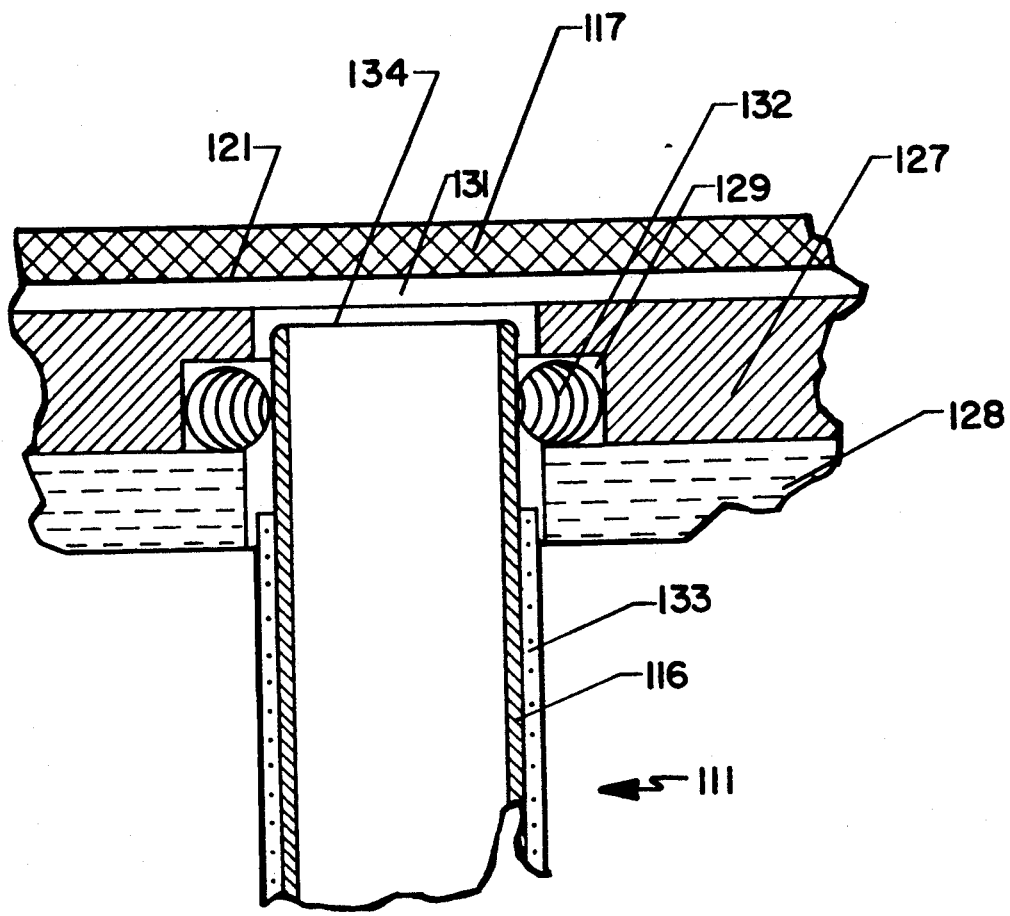
FIG. 5 is an enlarged cross-sectional view of a portion of the microphone cartridge shown in FIG. 4.

A secondary function of the backplate 127 is to serve as a fixed electrode of an electrostatic actuator which is used as a means of calibrating a microphone. The present invention provides the fixed electrode internally to the microphone. As discussed below, voltage from an external source is applied between the backplate 127 and the membrane 117 to generate an electrostatic force which attracts the membrane 117 toward the backplate 127. A preferred connection of the external voltage to the backplate 127 and membrane 117 is shown in the arrangement of FIG. 5. A coil spring 132, joined at the ends to form a toroid, is inserted into a slot 129. Other connections may also be used such as, for example, a leaf spring. The slot 129 may be formed, for example, by machining the slot into the backplate 127.

Figure 6:
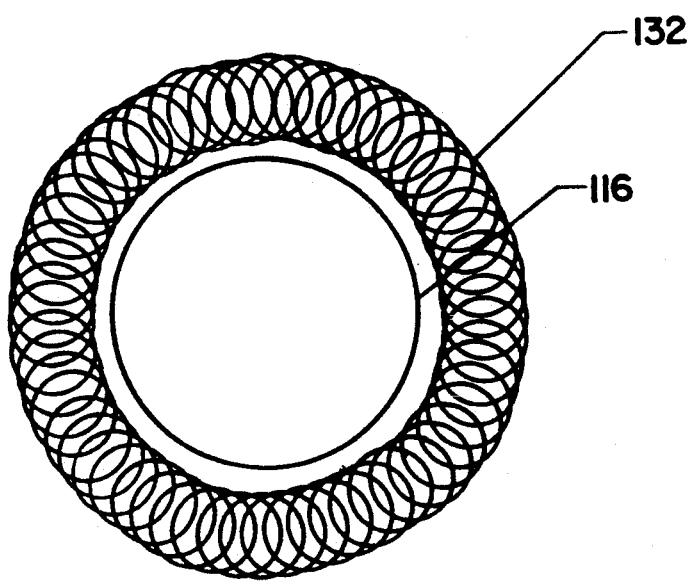
FIG. 6 is a top view of a coil spring used in the microphone cartridge shown in FIGS. 4 and 5.

Detail of the toroidal spring 132 is shown in FIG. 6. When the optical fiber probe 11 is inserted into the cartridge 100, the toroidal spring 132 makes a positive electrical contact with the metallic hypodermic tubing 116, thus providing two easily accessible connections, one being the tubing 116 (through the backplate 127) and the other the cartridge case 118 (to the membrane 117). Electrical insulation between the metallic tubing 116 and cartridge components is achieved by means of the insulating material 133. The insulating material may be, for example, teflon tubing, ceramic tubing, or any other insulating material.

The metallic portion of the backplate 127 may be film deposited on the insulating portion 128, in which case an alternate electrical connection is required.

If the applied voltage between the membrane 117 and backplate 127 consists of an AC component superimposed upon a DC component, then the electrostatic force excites the membrane into motion at the same frequency as the AC component. If the voltage consists of an AC component alone, then the frequency of the membrane motion will be twice that of the applied AC voltage component. In either case, a fixed amplitude of the AC component will produce a fixed amplitude of the exciting force upon the membrane 117.

The responding motion of the membrane 117 modulates the intensity of the light reflected from the mirror 121 in the same manner as when the membrane is excited by an incident sound pressure. Since the electrostatic force is known and constant, changes in membrane response, and thus microphone sensitivity, due to changes in environmental conditions can be monitored at any time.

To obtain the optimum performance from the microphone, it is necessary to adjust the gap, typically 0.005-0.006 in., between the distal end 134 of the optical fiber probe 111 and the mirror 21. This can be accomplished by manually moving the probe along the axis of the cartridge 100. The coil spring 132 facilitates such motion, in both directions, while maintaining positive electrical contact. After the final adjustment has been accomplished, the optical fiber must be secured in place.

A case seat 135, joined to the case 118 by means of threads 124, completes the cartridge assembly 100 shown in FIG. 4. It contains a plug 136, which fulfills two functions: (1) to secure the fiber probe 111 and (2) to complete the electrical connections to the electrostatic actuator electrodes 117 (membrane) and 127 (backplate).

The plug 136 has a hole through its center, which contains a straight section to pass the optical fiber probe 111 and a tapered section 137 to seat a ferrule 140, made of a readily compressible material such as, for example, nylon or teflon. As torque is applied to a nut 139 at the end of the plug 136 and the threads 138 of the plug engage those of the case seat 135, the ferrule 140 presses at first against surface B-B' of the seat and afterwards radially against the optical fiber probe 111. Sufficient pressure applied to the ferrule 140 secures the fiber probe 111 in place. Alternatively, the optical fiber probe 111 may be secured by means of a collar attached to the bottom surface of the case seat 135 in place of the plug 136 and ferrule 140.

A coaxial cable 141 completes the electrical connections between the electrostatic actuator electrodes and power supply. The coaxial cable 141 contains a center conductor 142, which is connected to the hypodermic tubing 116, and a braided shield 143, which is connected to the nut 139 by means of a jumper wire 144. In the embodiment selected for illustration, the center conductor 142 is soldered to the hypodermic tubing, and the jumper is soldered to the braided shield 141 and into a small hole 145 in the nut 139 at locations designated by 146A, 146B, and 146C respectively. The coaxial cable may alternatively be connected through a miniature connector in place of direct soldering. Thus the electrical path from the power supply PS to the fixed electrode of the electrostatic actuator consists of the center conductor 142, hypodermic tubing 116, coil spring 132, and backplate 127; the path to the variable electrode consists of the braided shield 143, jumper 144, plug 136, case seat 135, case 118 and membrane 117. The optical fibers within the probe 111 and coaxial cable 141 are retained by heat-shrinkable tubing 147, or other insulating cover, from the nut 139 up to their terminations.

Membrane material like nickel foil, as delivered, generally has insufficient optical reflectivity to serve as an effective mirror 22. Thus, the present invention also provides a novel procedure for providing sufficient optical reflectivity to thin membranes.

Figure 7A:
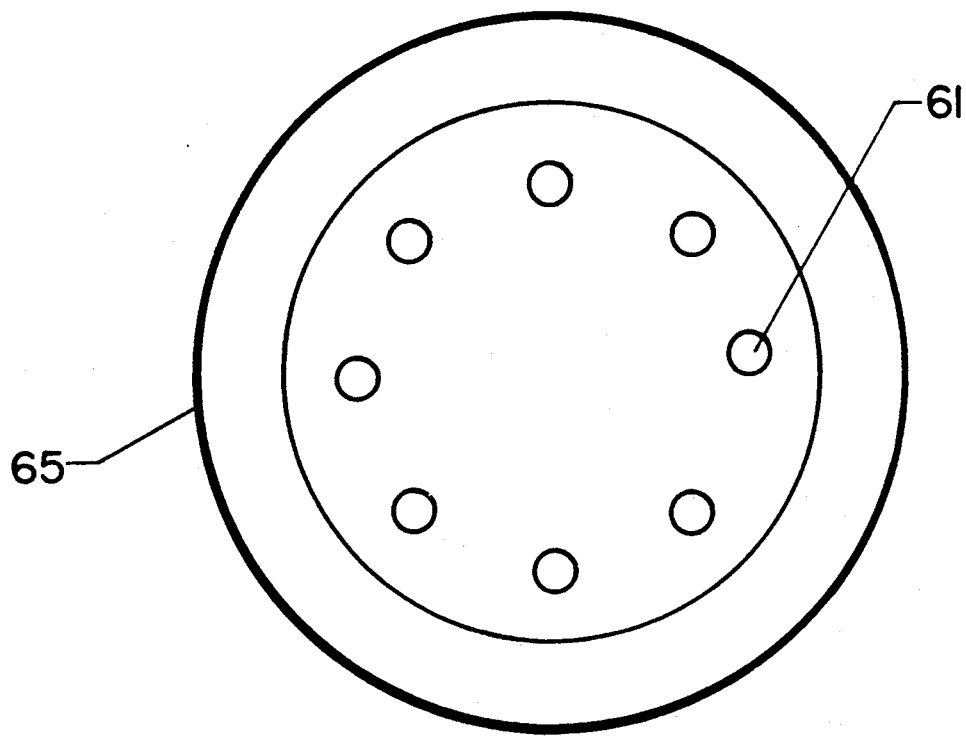
FIGS. 7A and 7B are cross-sectional views of a fixture assembly of the invention used to perform polishing.
Figure 7B:
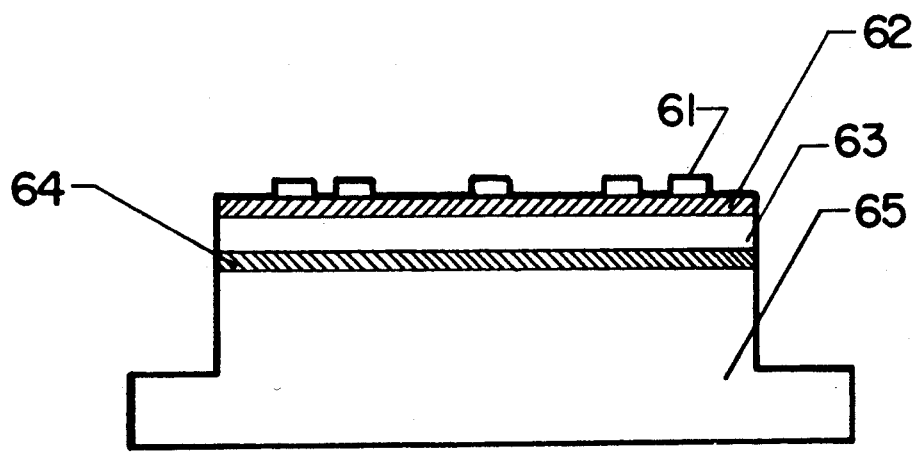

Discs of foil are cut having a one-fourth inch diameter from a sheet of foil, and are subjected to a procedure which improves the optical reflectivity sufficiently to meet the requirements of the microphone of the invention. FIGS. 7A and 7B show a novel fixture assembly 60 used to perform the polishing operation of the present invention. Foil discs 61 are mounted on a flat piece of a slide 63, for example a 2×2 inch crown glass microscope slide, which is mounted to a polishing fixture mount 65 in one operation. The bonding material for both mounts 62 and 64 may be a hard mounting wax, for example Crystal Bond 509. Initially, the polishing fixture mounts 65 and microscope slide 63 are heated to a temperature of approximately 180° F. Then the Crystal Bond 509 is applied to the mount 65 and microscope slide 63. The foil discs 61 are placed on the microscope slide 63 having a coating of bonding material, taking great care to ensure that no air is trapped under the disc 61. Any air trapped under the disc 61 will deform the thin disc upon cooling due to contraction. After the disc 61 and microscope slide 63 are mounted, the polishing fixture mount 65 is installed into a commercial polishing machine. In the example selected for illustration, the polishing fixture mount 65 may be inserted into a precision polishing jig PP5, which is installed into a precision lapping and optical polishing machine PM2A, both manufactured by Logitech Limited. After installation of the polishing fixture mount 65, polishing is accomplished by means of a polishing pad, for example a felt polishing pad which is continuously loaded with a 0.05 micron colloidal silica polishing suspension (Buehler Mastermet). After polishing, the discs 61 are dismounted by heating the polishing fixture assembly 60, and then cleaned to remove mounting wax residue, for example.

The membrane can also be polished by other methods, for example by vapor deposition, chemical polishing and the like.

The invention will be further illustrated in the following, non-limiting example, it being understood that the example is intended to be illustrative only and that the invention is not intended to be limited to the materials, conditions, process parameters and the like recited herein.

EXAMPLE

A high-temperature microphone cartridge is fabricated. Except for the membrane and fiber bundles, all parts are made of type 347 stainless steel. The membrane consists of 0.001" thick nickel 200, pressed into the shape of a cup having an outer diameter of 3.175 mm. The bottom side of the membrane is made shiny by a vapordeposition technique. After the tension ring and membrane are inserted over the microphone body, the clamping ring is press-fit to hold the membrane in place. Because friction is not adequate to retain the membrane as tension is applied, the membrane and bottom end of the clamping ring are together electron-beam welded to the body. The tension adjuster, such as that shown in FIG. 2, containing threads which engage similar threads in the body, is turned until its torque reaches a prescribed level; as it advances along the microphone axis, it pushes the tension ring and thus provides tension to the membrane.

The bundle of optical fibers, containing typically a central transmitting fiber and several peripheral receiving fibers, is pressed into a hypodermic needle. After the latter is inserted into the microphone body, the assembled cartridge is placed into a fixture, where the membrane is excited acoustically. The hypodermic needle is positioned until the microphone output is maximum, then locked in place by means of a pin vise at the bottom end of the cartridge. The active diameter of the membrane is not the outside diameter of the cartridge, rather the diameter of the inside hole in the tension ring. In this manner microphones of very small active diameter can be constructed. The properties of the fiber bundle are listed in Table 1.

TABLE 1

| Optical fiber bundle used in a microphone. | |
|---|---|
| Operating temperature | to 600° C. (1112° F.) |
| Fiber type | metal-coated step-index multimode |
| Core diameter | 100 μm |
| Cladding diameter | 140 μm |
| Coating diameter | 165 μm |
| Number of fibers | 7 |
| Hypodermic needle | #21, 0.032" OD × 0.023" ID |

The distance between the proximal end of the fiber bundle and the membrane surface is typically 150 μm. This distance is too small to permit the placement of a backplate in the air gap to dampen the membrane motion. Nevertheless the bundle of optical fibers may itself serve to fulfill this function. Space between the fibers serving as long vent holes provide viscous damping if the tolerances are sufficiently small. Otherwise, an adhesive is required, and damping may be foregone or provided through capillary openings. If the six receiving fibers are arranged uniformly around a central transmitting fiber, as indicated in Table 1 without adhesive, then there are six such vent holes adjacent to the central fiber and six more around the periphery of the bundle.

The response of a prototype microphone can be predicted with the aid of a theory of condenser microphones as extended by Hu, "Theoretical and Experimental Study of the Optical Fiber Microphone," Dissertation. University of Rhode Island (1987) to fiber optic microphones. A summary of pertinent material and geometric properties is given in Table 2. The membrane tension corresponds to a radial stress assumed to be 25% of the yield stress. In reality this parameter will be very difficult to determine. The membrane thickness is chosen to be five times that found in commercial condenser microphones in order to improve mechanical stability at elevated temperatures. The air gap dimension is based solely upon optical response. The membrane resonant frequencies are computed from the classical formula for an undamped stretched membrane. Since the response at the membrane center, unlike that of the membrane mean, does not fall dramatically shortly after the fundamental resonant frequency, the microphone should prove useful up to the second harmonic and thus fulfill even demanding specifications on bandwidth.

Exposure to high temperatures has three primary effects upon microphone performance. First, thermal expansion increases all dimensions. The increase in gap, in particular, introduces a loss of optical sensitivity. Secondly, a reduction in elastic modulus causes the membrane to relax and lose tension. This effect actually improves the mechanical sensitivity and partly compensates for the optical loss. However, there is an accompanying loss of bandwidth. Finally, an increase in air viscosity improves the membrane damping, but this is important only near a resonant frequency. A decrease in air density is but a minor effect because the air gap compliance is secondary to the membrane compliance.

TABLE 2

| Summary of microphone properties at room and elevated temperatures. | | |
|---|---|---|
| Temperature | 20° C. (68° F.) | 600° C. (1112° F.) |
| Membrane (Ni) | | |
| Radius, mm | 0.4064 | 0.4103 |
| Thickness, μm | 25.4 | 25.4 |
| Density, kg/m³ | 8800 | 8673 |
| Tension, N/m | 2616 | 2118 |
| Resonant freq. in vacuum | | |
| Fundamental, Hz | 101884 | 91466 |
| Second harmonic, Hz | 233870 | 209955 |
| Air | | |
| Density, kg/m³ | 1.205 | 0.4357 |
| Isothermal sound vel., m/s | 290.16 | 476.1 |
| Viscosity, μPa-sec | 18.18 | 37.3 |
| Gap, μm | 150 | 151.5 |
| Specific heat ratio | 1.403 | 1.35 |
| Holes, inner ring & outer ring | | |
| Quantity | 6 & 6 | 6 & 6 |
| Distance from center, mm | 0.082 & 0.2475 | 0.082 & 0.2475 |
| Radius, mm | 0.056 & 0.056 | 0.056 & 0.056 |
| Depth, mm | 38.1 & 38.1 | 38.1 & 38.1 |
| Backchamber volume*, m³ | 1 000 000 | 1 000 000 |

*For computational purpose only.

MICROPHONE PERFORMANCE

Figure 8:
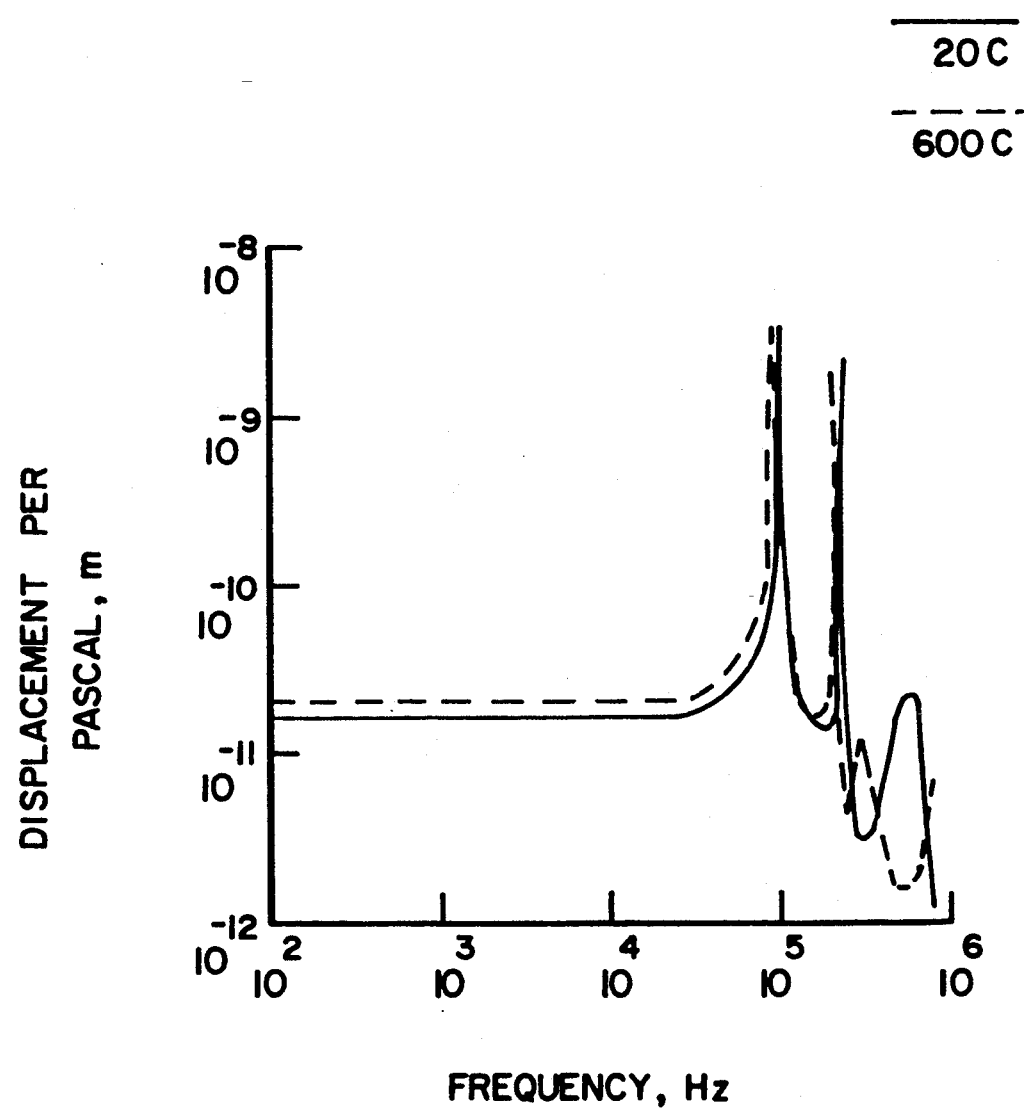
FIG. 8 is a graph of displacement versus frequency of a microphone of the invention.

The predicted response of the microphone described in Table 2, according to the theory of Hu, above, is shown in FIG. 8. The membrane motion is obviously underdamped, but in the absence of a backplate remedial measures will prove difficult. Any internal friction within the Ni 200 material itself may help to compensate. The unloaded membrane resonant frequency is 102 kHz at room temperature and drops to 91.5 kHz at 600° C. (1112° F.). The upper cutoff frequency, where the amplitude is 3 db below its low-frequency level, actually lies beyond the second membrane resonance, located at 234 and 210 kHz for the two temperatures respectively. The high-temperature response further shows a slight improvement in sensitivity and, despite the loss in bandwidth, is highly satisfactory. The minimum detectable sound pressure level is determined by thermal noise in the photodetector and amplifier and is expected to lie in the vicinity of 130 dB re 20 μpa. The microphone is expected to operate linearly over a dynamic range from 130 to at least 190 dB.

While the invention has been described with reference to particular preferred embodiments, the invention is not limited to the specific examples given, and other embodiments and modifications can be made by those skilled in the art without departing from the spirit and scope of the invention.

What is claimed is:

1. An apparatus for measuring pressure fluctuations, comprising:
   an optical fiber probe comprising a single optical fiber for transmitting light from a light source and a plurality of optical fibers for receiving and transmitting reflected light;

a pressure-sensing membrane having a reflecting surface for reflecting said light, wherein said reflecting surface undergoes deflections in relation to the pressure fluctuations to be measured, said membrane is under tensile stress while at rest, wherein said optical fiber probe is arranged such that said single optic fiber transmits light to the approximate center of the reflecting surface and the plurality of optical fibers receives and transmits the reflected light, whereby the light reflected by center displacement of the membrane is indicative of the sound pressure incident on the membrane.

2. The apparatus of claim 1, wherein an active area of the reflecting surface has dimensions which substantially correspond to dimensions of a cross section of the optical fiber probe 3. The apparatus of claim 1, said apparatus having a frequency response of at least 100 kHz 4. The apparatus of claim 1, further comprising a tension adjuster for adjusting said tensile stress.

5. The apparatus of claim 1, further comprising an adjustable tension ring for supporting and applying said tensile stress to said membrane, said tension ring being provided with an axial hole having dimensions which substantially correspond to dimensions of said reflecting surface.

6. The apparatus of claim wherein said membrane is stretched over a convex surface having an opening therein for allowing said transmitted and reflected light to pass therethrough.

7. The apparatus of claim 6, wherein said convex surface is substantially hemispherical.

8. The apparatus of claim 1, wherein said optical fiber probe is at least partly encased in a heat resistant sheath.

9. The apparatus of claim 8, wherein said optical fiber probe is resistant to temperatures higher than 1000° F.

10. The apparatus of claim 8, wherein said sheath comprises a rigid tube encasing part of said optical fiber probe proximate to said membrane, and a flexible tube encasing another part of said optical fiber probe.

11. The apparatus of claim 10, wherein said flexible tube overlaps said rigid tube.

12. The apparatus of claim 8, further comprising a high temperature resistant bonding agent for holding said optical fibers within at least part of said sheath proximate said membrane.

13. The apparatus of claim 1, further comprising a backplate adjacent said membrane of the same side of said membrane as said optical fiber probe, said backplate having an axial opening.

14. The apparatus of claim 13, wherein said backplate has a damping effect on vibrations of said membrane.

15. The apparatus of claim 13, further comprising a voltage source connected to said backplate and said membrane which can create a known voltage potential between said backplate and said membrane.

16. An apparatus for measuring pressure fluctuations, comprising:

an optical fiber probe comprising a single optical fiber for transmitting light from a light source and a plurality of optical fibers for receiving and transmitting reflected light to a light receiver; and a pressure-sensing membrane having a reflecting surface for reflecting said light, wherein said reflecting surface undergoes deflections in relation to pressure fluctuations to be measured, and an active area of the reflecting surface has dimensions which substantially correspond to dimensions of a cross-section of the optical fiber probe, wherein said optical fiber probe is arranged such that said single optic fiber transmits light to the approximate center of the reflecting surface and the plurality of optical fibers receives and transmits the reflected light, whereby the light reflected by center displacement of the microphone is indicative of the sound pressure incident on the membrane.

17. The apparatus of claim 16, wherein said active area and said cross section are each substantially circular and have substantially the same diameter.

18. The apparatus of claim 16, wherein said optical fiber probe has a temperature resistance of at least 1000° F.

19. The apparatus of claim 16, wherein at least a part of said optical fiber probe proximate said membrane is encased in hypodermic needle tubing.

20. The apparatus of claim 16, wherein said membrane is under tensile stress while at rest.

21. The apparatus of claim 20, wherein said optical fiber has a frequency response of at least 100 kHz.

22. The apparatus of claim 20, wherein said membrane is stretched over a convex tension ring provided with an axial opening which defines said active area.

23. The apparatus of claim 22, wherein said convex tension ring is substantially hemispherical.

24. An apparatus for measuring pressure fluctuations, comprising:

an optical fiber probe comprising a single optical fiber for transmitting light from a light source and a plurality of optical fibers for receiving and transmitting reflected light to a light receiver, a pressure-sensing membrane having a reflecting surface for reflecting said light, wherein said reflecting surface undergoes deflections in relation to pressure fluctuations to be measured, wherein said membrane is under tensile stress while at rest, wherein said optical fiber probe is arranged such that said single optic fiber transmits light to the approximate center of the reflecting surface and the plurality of optical fibers receives and transmits the reflected light, whereby the light reflected by the center displacement of the membrane is indicative of the sound pressure incident on the membrane; and a pin-vise assembly for securing the optical fiber probe such that a constant gap is provided between an end of the optical fiber probe and said reflecting surface when said reflecting surface is at rest.

* * * * *

UNITED STATES PATENT AND TRADEMARK OFFICE
CERTIFICATE OF CORRECTION

PATENT NO. : 5,146,083
DATED : September 8, 1992
INVENTOR(S) : ZUCKERWAR ET AL.

It is certified that error appears in the above—identified patent and that said Letters Patent is hereby corrected as shown below:

On title page, item [75] should read as follows;

[75] Inventors: Allan J. Zuckerwar, Newport News, VA; Frank W. Cuomo, East Providence, RI; William E. Robbins, Achilles, VA Signed and Sealed this Fourteenth Day of September, 1993

Attest:

BRUCE LEHMAN

Attesting Officer

Commissioner of Patents and Trademarks